May 2, 1950   J. A. SIMPSON, JR   2,505,919
PROPORTIONAL COUNTER
Filed Dec. 31, 1946
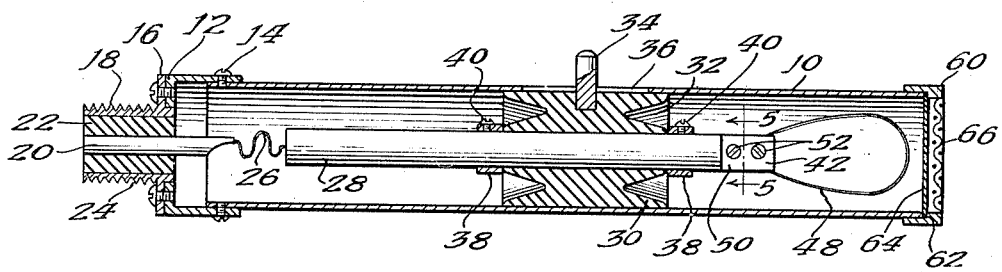
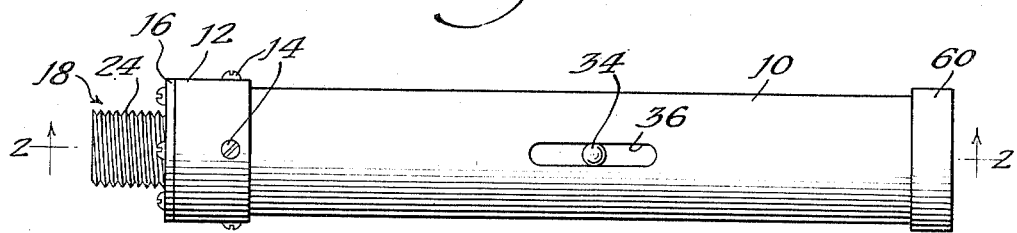
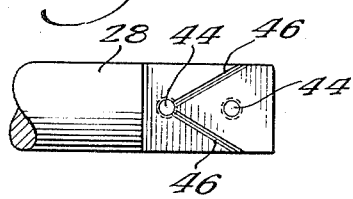  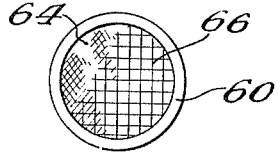
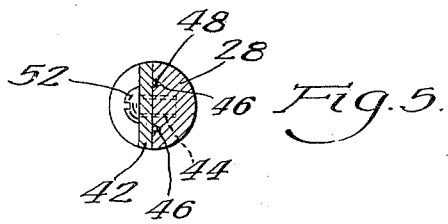
INVENTOR.
John A. Simpson, Jr.
BY
Robert A. Lavender
Attorney Patented May 2, 1950

2,505,919

UNITED STATES PATENT OFFICE 2,505,919

PROPORTIONAL COUNTER

John A. Simpson, Jr., Chicago, Ill., assignor to the United States of America as represented by the Atomic Energy Commission Application December 31, 1946, Serial No. 719,526

16 Claims. (Cl. 250—27.5)

This invention pertains to an improved proportional counter for the detection and measurement of alpha particle emission. More specifically, the invention pertains to a proportional counter adapted to detect and measure contamination of beakers, bottles, and like containers by radioactive materials which emit alpha particles such as, for example, plutonium.

Certain radioactive materials such as plutonium are very dangerous if received into the body. It is desirable in installations such as laboratories where such materials are handled to make frequent surveys for detection of contamination of various articles in the laboratories by such substances. Also, from a chemical point of view, it is necessary that beakers and like devices be checked before use to be certain that no such contamination remains from previous use of the container. The only practical method for detecting such contamination in minute quantities is the detection of the alpha particles emitted therefrom.

The present inventor has in his copending application, Serial No. 719,525, filed in the United States Patent Office on December 31, 1946, disclosed a novel proportional counter which is particularly well adapted for making contamination surveys in such places as laboratories. The device described in the above application is, however, not adapted to be inserted as a probe into such places as beakers, bottles or other spaces having similar contours.

It is, therefore, the principal purpose of the present invention to provide a proportional counter which is adapted to be inserted as a probe into small cavities, and more particularly into beakers and similar containers.

For understanding of the invention, reference is made to the drawing in which

Fig. 1 is a plan view of a proportional counter beaker probe;

Fig. 2 is a longitudinal cross sectional view taken along the line 2—2 of Fig. 1 in the direction indicated by arrows;

Fig. 3 is an end view of the counter probe of Fig. 1 with a metal screen which constitutes a portion thereof partially broken away;

Fig. 4 is an enlarged fragmentary view of a support rod shown in Fig. 2; and

Fig. 5 is a transverse cross sectional view of a support rod assembly taken along the line 5—5 of Fig. 2 in the direction indicated by arrows.

Referring first to Figs. 1 and 2, a tubular conducting housing 10, for example of aluminum, has at one end thereof a conducting cap 12 secured thereto by radial screws 14. To the cap 12 is fastened a flange 16 of a conventional coaxial cable connector 18 having a center conductor 20, an insulator 22, preferably of polystyrene, and a threaded shield 24 which is integral with the flange 16. To the end of the center conductor 20 within the housing 10 is soldered one end of a flexible wire 26, the other end of which is soldered to a support rod 28, for example of brass. The support rod 28 extends through an axial bore in a cylindrical polystyrene insulator 30, which has an outside diameter adapted to fit slidably within the housing 10. The polystyrene insulator 30 preferably has deep annular grooves 32 at both ends thereof in order to maximize the length of the surface-leakage path between the support rod 28 and the housing 10.

Imbedded in the insulator 30, for example by a forced fit, is a short peg 34, for example of Bakelite, which protrudes through a longitudinal slot 36 in the housing 10. The peg 34 thus serves as a thumb-catch for moving the insulator 30 longitudinally within the housing 10. Mounted upon the support rod 28 are collars 38, for example of brass, which are fixed in position on support rod 28 by set screws 40, the collars 38 maintaining pressure against the insulator 30 at both ends thereof so as to retain the support rod 28 firmly in position with respect to the insulator 30.

The end portion of the support rod 28 is milled so as to have a flat surface as shown more clearly in Figs. 4 and 5. A plate 42 is mounted on the flat surface. As illustrated in Fig. 4, which is an enlarged view of the end portion of the rod 28 with the plate 42 removed, the flattened end has therein two transverse bores 44 threaded to receive small screws. Grooves 46 are milled into the flat surface to form a V having its axis on the axis of the rod 28. Lying within the grooves 46 are the two ends of an anode wire 48. As is well known, the anode wire of a proportional counter must be extremely small in diameter. The wire 48 may be, for example, of 1 mil tungsten. Upon the flattened end of the rod 28 is the clamping plate 42 secured by screws 52 which are screwed into the threaded apertures 44. The clamping plate 42 thus clamps the ends of the wire 48 into the grooves 46, which are of a depth slightly smaller than the diameter of the wire 48.

The above mounting for the anode wire 48, illustrated in detail in Figs. 4 and 5, offers great advantage in uniform assembly of counters such as that illustrated, and in ready replacement of the anode wire 48. Anode wires 48 of such small diameters as above mentioned cannot conveniently be bent into reproducible forms which may be expected to retain the shape into which they were originally bent. The most satisfactory method for producing uniform shaping of such wires is the use of prestraightened wires and the mounting of the ends in predetermined orientation. By the use of such prestraightened wires of accurately measured equality in length with the mounting arrangement illustrated in the drawing, it has been found that the anode wire 48 may be readily replaced without introducing any substantial differences in the operating characteristics of the counter.

Over the end of the housing 10 adjacent the anode wire 48 is a tight-fitting ring 60 having a shoulder portion 62 internally thereof. Stretched across the ring 60 and fastened to the shoulder portion 62, for example by cement, is a thin sheet window 64 of a material readily permeable to alpha particles. The window 64 may be made, for example, of nylon 0.2 mil in thickness. On the inner surface of the window 64 is a thin coating, for example of graphite (not visible in the drawing), rendering the inner surface of the window, which makes contact with the housing 10 at the edges thereof, conducting.

Over the window 64 is a coarse wire mesh screen 66 secured to the outer surface of the ring 60, for example by spot welding. The screen 66 serves to protect the fragile window 64 against breakage.

It is desirable that all parts be finely machined to small tolerances in order to prevent the entrance of dust. However, it is not desirable that any oil or grease be allowed to remain on the inner surfaces between the various connecting parts because the counter is designed to have as the filling thereof air at atmospheric pressure. It has been found that even with the finest of machining, sufficient leakage exists between the interior and exterior so that no substantial pressure differential can appear across the window 64. Such a pressure differential might, if it were allowed to exist, cause rupture of the window.

The anode wire 48, which is thus in the form of a loop in a plane normal to the window 64 is closer to the window 64 than it is to the housing 10. Therefore, the electric fields which are created by impressing a potential between the housing 10 and the anode wire 48 by means of the connector 18 are much greater between the anode wire and the window 64, which is at the same potential as the housing 10, than they are between the anode wire 48 and the housing 10. The active region of the counter is, therefore, confined to that portion near the window. As is well known, the operating voltage of the counter is affected by the spacing between the anode and the cathode. In the counter illustrated in the drawing, adjustment of the operating voltage may be made by moving the anode 48 with respect to the window 64, which is the effective portion of the cathode, by means of the peg 34 which moves in the slot 36. This feature offers great advantage in that small differences which may occur in assembling large numbers of the counters may be compensated by adjustment of the position of the anode wire 48 so that all counters operate at the same voltage. This makes it unnecessary to perform calibration procedures upon substitution of one counter probe for another, and likewise makes possible the use of the counter probes with voltage supplies which are not readily susceptible of variation.

The counter probe illustrated in the drawing may be made with a large variety of dimensions. As one example, the housing 10 may be 1 inch in diameter and 6 inches in length; the support rod 28 may be ¼ inch in diameter and 4 inches in length; and the insulator 30 may be 1½ inches long. The wire screen 66 is preferably of nickel, which is readily cleaned. The above dimensions are well suited for surveying such surfaces as laboratory containers, drinking glasses, etc. The counter probe may be made in much smaller dimensions. For example, it may be made sufficiently small in diameter to be readily inserted into the human nose in order to measure the amount of deposition of such substances as plutonium on the interior of the nasal passage. For sanitary purposes, the window 64 may cover the entire end of the counter probe thus inserted and may be readily replaceable so that a new window may be used on each individual subject to such examination.

Many adaptations of the teachings of this invention other than the precise embodiment of the drawing described above will occur to persons skilled in the art. As obvious examples, the orientation of the anode with respect to the cathode, the adjustability of the anode-cathode spacing, and the mounting arrangement which allows ready replacement of the anode wire, may easily be adapted to devices other than the one illustrated. The scope of the invention should, therefore, be deemed to be limited only by the claims.

What is claimed is:

1. A radiation counter comprising, in combination, a tubular cathode having over an end thereof a conducting window permeable to charged particles, a rod-like conducting member insulatingly supported axially of the cathode, an anode comprising a loop of wire mounted on the end of the rod-like member adjacent to the window in a plane normal to the plane of the window, and means for moving the rod-like member longitudinally so as to change the spacing between the anode and the cathode.

2. A radiation counter comprising, in combination, a tubular cathode having over an end thereof a conducting window permeable to charged particles, a substantially cylindrical insulator adapted to fit slidably into the tubular cathode, and being longitudinally adjustable in position therein, a rod-like conducting member supported axially of the cathode by the insulator, and an anode comprising a loop of wire mounted on the end of the rod-like member adjacent to the window in a plane normal to the plane of the window.

3. A radiation counter comprising, in combination, a cathode having at least a portion thereof composed of a conducting window permeable to charged particles, a conducting anode-support member within the cathode and insulated therefrom, an anode comprising a loop of wire mounted on the anode-support member adjacent to the window in a plane normal to the plane of the window, and means for moving the anode-support member so as to change the spacing between the anode and the cathode.

4. In a radiation counter, in combination, a tubular electrode having a plane portion at an end thereof and a second electrode; the second electrode comprising a loop of wire supported substantially at one point, the plane of the loop being normal to the plane portion of the first electrode.

5. In a radiation counter, in combination, a substantially tubular first electrode having a conducting surface over an end thereof and a second electrode, the second electrode comprising a loop of wire supported substantially at one point, the plane of the loop being movable with respect to the conducting surface.

6. In a radiation counter, in combination, a tubular electrode having a plane portion at an end thereof and a second electrode, the second electrode comprising a loop of wire lying in a plane normal to the plane portion of the first electrode.

7. In a radiation counter, a plurality of electrodes, at least one of said electrodes comprising a loop of wire having both ends at the same electrical potential and another of said electrodes comprising a membrane permeable to alpha particles, the first electrode being adjacent the membrane in a plane normal to the membrane.

8. In a radiation counter, in combination, a substantially tubular first electrode having a conducting surface over an end thereof and a second electrode, the second electrode comprising a loop of wire supported substantially at one point.

9. A proportional counter comprising, in combination, a substantially cylindrical cathode having at an end thereof a window having a conducting coating permeable to alpha particles, an anode insulatingly supported within said cathode, an ionizing medium comprising air at atmospheric pressure, a cable connector mounted on the opposite end of the cylindrical electrode, and conducting means including a flexible wire connecting the anode and the cable connector.

10. A proportional counter comprising, in combination, a substantially tubular electrode having at an end thereof a window having a conducting coating permeable to alpha particles, a second electrode insulatingly supported within said first electrode, an ionizing medium within said first electrode comprising air at atmospheric pressure, a cable connector mounted on the opposite end of the tubular electrode, and conducting means including a flexible wire connecting the second electrode to the cable connector.

11. In a radiation counter, in combination, a substantially tubular first electrode having a conducting surface permeable to alpha particles over an end thereof and a second electrode, the second electrode comprising a loop of wire supported substantially at one point, the plane of the loop being normal to the plane of said surface.

12. In a radiation counter, in combination, a substantially tubular first electrode having a conducting surface over an end thereof and a second electrode, the second electrode comprising a loop of wire supported substantially at one point, the plane of the loop being normal to the conducting surface.

13. In a radiation counter, in combination, an outer electrode having side and end portions and having a longitudinal slot in the side portion, an insulating member abutting against the inner surface of the outer electrode and longitudinally slideable thereupon, a peg member affixed to the insulating member and protruding outwardly through the slot, and an inner electrode spaced from the end portion of the outer electrode and supported by the insulating member, whereby the spacing between the electrodes may be adjusted by adjusting the longitudinal position of the peg member within the slot.

14. In a radiation counter, in combination, a tubular electrode having a conducting member over the end thereof and having a longitudinal slot in the side thereof, an insulating member abutting against the inner surfaces of the tubular electrode and longitudinally slideable therein, a peg affixed to the insulating member and protruding outwardly through the slot, and an inner electrode within the tubular electrode spaced from the end member and supported by the insulating member, whereby the spacing between the inner electrode and the end member may be adjusted by adjusting the longitudinal position of the peg within the slot.

15. In a radiation counter, in combination, an outer electrode having side and end portions, an insulating member abutting against the inner surface of the outer electrode and longitudinally slideable thereupon, and an inner electrode spaced from the end portion of the outer electrode and supported by the insulating member, whereby the spacing between the electrodes may be adjusted by adjusting the longitudinal position of the insulating member.

16. In a radiation counter, in combination, an anode member, a cathode member and an insulating support maintaining the electrode members in spaced relationship, the support being slideable with respect to at least one of the electrode members in the direction of the shortest distance therebetween, so that the spacing between the electrode members may be adjusted.

JOHN A. SIMPSON, Jr.

REFERENCES CITED

The following references are of record in the file of this patent:

UNITED STATES PATENTS

| Number | Name | Date |
| --- | --- | --- |
| 758,971 | Jordan | May 3, 1904 |
| 1,677,000 | Moore | July 10, 1928 |
| 2,305,188 | Nowicke | Dec. 15, 1942 |
| 2,368,486 | Mullane | Jan. 30, 1945 |

OTHER REFERENCES

Geiger and Müller, Physikalische Zeitschrift, vol. 30, Aug. 15, 1929, pp. 489–493.

Korff, Electron and Nuclear Counters, D. Van Nostrand Co., Apr. 1946, pp. 75–77 and 80–83.

Strajman, article in Review of Scientific Instruments, vol. 17, June 1946, pp. 232–234.